(12) United States Patent
Kawaguchi (10) Patent No.: US 6,482,126 B2
(45) Date of Patent: Nov. 19, 2002

(54) LOCKUP CONTROL DEVICE (75) Inventor: Takateru Kawaguchi, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 09/863,070

(22) Filed: May 22, 2001

(65) Prior Publication Data
US 2002/0013193 A1 Jan. 31, 2002

(30) Foreign Application Priority Data
May 31, 2000 (JP) ........................................ 2000-163368

(51) Int. Cl.$^7$ ................................................ B60K 41/02
(52) U.S. Cl. .......................... 477/180; 477/80; 477/84; 477/176; 192/3.3; 192/3.63
(58) Field of Search ................................ 477/70, 77, 79, 477/80, 83, 84, 86, 166, 168, 169, 174, 175, 176, 180; 192/3.29, 3.3, 3.58, 3.63

(56) References Cited

U.S. PATENT DOCUMENTS

| 5,060,769 A | * | 10/1991 | Yoshimura et al. ........ 192/3.29 |
| 5,143,191 A | * | 9/1992 | Nobumoto et al. ..... 477/176 X |
| 5,643,137 A | * | 7/1997 | Suzuki ...................... 477/169 |
| 6,036,619 A | * | 3/2000 | Tashiro et al. ............ 477/83 X |
| 6,059,690 A | * | 5/2000 | Tanizawa et al. ........... 477/169 |
| 6,077,188 A | * | 6/2000 | Futamura et al. ......... 477/78 X |
| 6,183,389 B1 | * | 2/2001 | Tabata ........................ 477/174 |
| 6,290,626 B1 | * | 9/2001 | Noda et al. ............. 477/174 X |

FOREIGN PATENT DOCUMENTS

JP           405332444    * 12/1993    .................. 477/176

* cited by examiner

Primary Examiner—Charles A Marmor
Assistant Examiner—Ha Ho
(74) Attorney, Agent, or Firm—Rossi & Associates (57) ABSTRACT

A control unit controls a lockup duty ratio to be maintained at a first duty ratio, which is the minimum value within such a range as not to slip a lockup clutch, during a period of time since a decision is made to perform a shifting operation until an actual shifting operation is started. The control unit then lowers the lockup duty ratio to a corrected (learned) second duty ratio and gradually lowers the lockup duty ratio from the second duty ratio at a predetermined rate of change so that a slip revolutionary speed can be equal to a target slip revolutionary speed when the shifting operation is finished. Alternatively, the control unit corrects the rate of change while maintaining the second duty ratio at a uniform value so that the slip revolutionary speed can be equal to the target slip revolutionary speed when the shifting operation is finished.

10 Claims, 6 Drawing Sheets

LOCKUP CONTROL DEVICE

BACKGROUND OF THE INVENTION

1. Field of the Invention

The present invention relates to a lockup control device of an automatic transmission, which has a lockup clutch in a torque converter and engages a lockup clutch in a predetermined operating range.

2. Description of the Prior Art

Conventionally, a lockup control device is constructed in such a manner as to disengage a lockup clutch to relieve a shock when a shifting operation is started in the state wherein the lockup clutch is engaged at a predetermined shift position.

If, however, a controlled variable of the lockup clutch is suddenly reduced to disengage the lockup clutch when a decision is made to perform the shifting operation (that is, when a shift command is detected), the engine may blow up or a shift shock may occur.

To address this problem, Japanese Patent Application Laid-open Publication No. 5-172239, for example, discloses controlling a hydraulic pressure to the minimum value (the intermediate hydraulic pressure) within such a range as not to slip the lockup clutch when a decision is made to perform a shifting operation, and then gradually lowering the hydraulic pressure to disengage the lockup clutch to thereby prevent the shift shock.

In this device, when the engagement or disengagement of the lockup clutch is performed without changing a shift position, a controlled variable of the lockup clutch at the time when a slip revolutionary speed (=an engine speed–turbine revolutionary speed of a torque converter) gradually becomes zero or starts changing gradually from zero is learned for each input torque of the torque converter, and the intermediate hydraulic pressure is corrected with the learned variable in the next shifting operation.

The above prior arts, however, have a disadvantage because the slip revolutionary speed at the end of the shifting operation cannot always be uniform and thus the shift shock cannot be reduced stably.

More specifically, the hydraulic pressure is lowered at a predetermined gradient from the minimum hydraulic pressure within such a range as not to slip the lockup clutch. Therefore, the slipping state of the lockup clutch at the end of the shifting operation is changed if a shifting time varies due to the variations and the deterioration of shift clutches,. This may increase the shift shock.

Moreover, the intermediate hydraulic pressure is determined from the hydraulic pressure at which the turbine revolutionary speed is equal to the engine speed when the lockup clutch is engaged or disengaged. Actually, however, the intermediate hydraulic pressure is obtained from the hydraulic pressure that is rising (lowering when the lockup clutch is disengaged) at a predetermined rate of change. Thus, there is a difference between the actual hydraulic pressure and the detected hydraulic pressure, and this makes it difficult to correctly determine the intermediate hydraulic pressure. Even if the intermediate hydraulic pressure can be set correctly, the actual hydraulic pressure may overshoot and cause the engine to blow up.

SUMMARY OF THE INVENTION

It is therefore an object of the present invention to provide a lockup control device that is able to surely prevent the blow up of an engine and the occurrence of a shift shock during a shifting operation.

The above object can be accomplished by providing a lockup control device for an automatic transmission equipped with a lockup clutch which is controlled by a hydraulic pressure regulated with a lockup duty ratio, and which is disengaged during a shifting operation, said lockup control device comprising: a lockup duty ratio control means for setting the lockup duty ratio at a predetermined duty ratio at the time an actual shifting operation is started and controlling the lockup duty ratio in such a manner that a hydraulic pressure is lowered from a hydraulic pressure corresponding to the predetermined duty ratio at a predetermined rate of change until the shifting operation is finished; and wherein the lockup duty ratio control means learning-controls the predetermined duty ratio so that a slip revolutionary speed at the end of the shifting operation can be equal to a target slip revolutionary speed.

On the start of the actual shifting operation, the lockup duty ratio is lowered at the predetermined rate of change from the predetermined duty ratio so that the slip revolutionary speed reaches the target slip revolutionary speed at the end of the shifting operation. Thus, even if the shifting time is short or the shifting time varies according to the variation, the deterioration, etc. of shift clutches, the target slip revolutionary speed is realized stably at the end of the shifting operation and the shift shock is reduced.

In one preferred form of the present invention, the lockup duty ratio control means learning-corrects the predetermined duty ratio according to a difference between a slip revolutionary speed and a target slip revolutionary speed at the end of a prior shifting operation, thereby making the slip revolutionary speed at the end of the present shifting operation closer to the target slip revolutionary speed.

This enables the slip revolutionary speed to accurately reach the target value at the end of the shifting operation.

In another preferred form of the present invention, the lockup duty ratio control means learning-corrects the predetermined rate of change according to a difference between a slip revolutionary speed and a target revolutionary speed at the end of a prior shifting operation, thereby making the slip revolutionary speed at the end of the present shifting operation closer to the target slip revolutionary speed.

This also enables the slip revolutionary speed to accurately reach the target value at the end of the shifting operation.

And this makes the time for re-engagement of the lockup clutch after the finish of the shifting operation rather short, thereby preventing an increase of fuel consumption.

In another aspect of the invention, the lockup control device comprises: first lockup duty ratio setting and maintaining means for setting the lockup duty ratio at a first duty ratio as a lower control hydraulic pressure than a control hydraulic pressure before a determination of the shifting operation within such a range as not to slip the lockup clutch and maintaining the first duty ratio until an actual shifting operation is started; second lockup duty ratio control means for setting the lockup duty ratio at a second duty ratio at the time an actual shifting operation is started and controlling the lockup duty ratio in such a manner that a hydraulic pressure is lowered from a hydraulic pressure corresponding to the second duty ratio at a predetermined rate of change until the shifting operation is finished; and wherein the second lockup duty ratio control means learning-controls the second duty ratio so that a slip revolutionary speed at the end of the shifting operation can be equal to a target slip revolutionary speed.

According to the present invention, since the lockup duty ratio is set to the first duty ratio when the decision is made to perform the shifting operation, it is possible that the lockup clutch come into the slipping state after the start of the actual shifting operation even if a shifting time is short. Moreover, since the first duty ratio realizes the minimum hydraulic pressure within such a range as not to slip the lockup clutch, the lockup clutch is prevented from slipping until the start of the actual shifting operation.

On the start of the actual shifting operation, the lockup duty ratio is lowered at the predetermined rate of change from the second duty ratio, which is determined separately from the first duty ratio, so that the slip revolutionary speed reaches the target slip revolutionary speed at the end of the shifting operation. Thus, even if the shifting time is short or the shifting time varies according to the variation, the deterioration, etc. of shift clutches, the target slip revolutionary speed is realized stably at the end of the shifting operation and the shift shock is reduced.

In yet another preferred form of the invention, the first lockup duty ratio setting and maintaining means corrects the first duty ratio and maintains the corrected first duty ratio during a next shifting operation if it detects a slip of the lockup clutch while maintaining the first duty ratio during the present shifting operation.

This prevents the blow up of the engine and reduces the shift shock.

In yet another proffered form of the present invention, if a lockup duty ratio is not a maximum value when the decision is made to perform the shifting operation, the first duty ratio and the second duty ratio or the predetermined rate of change are prohibited from being corrected.

This prevents the blow up of the engine and the shift shock due to the incorrect learning.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of the present invention will be described hereinbelow with reference to the accompanying drawings.

Figure 1:
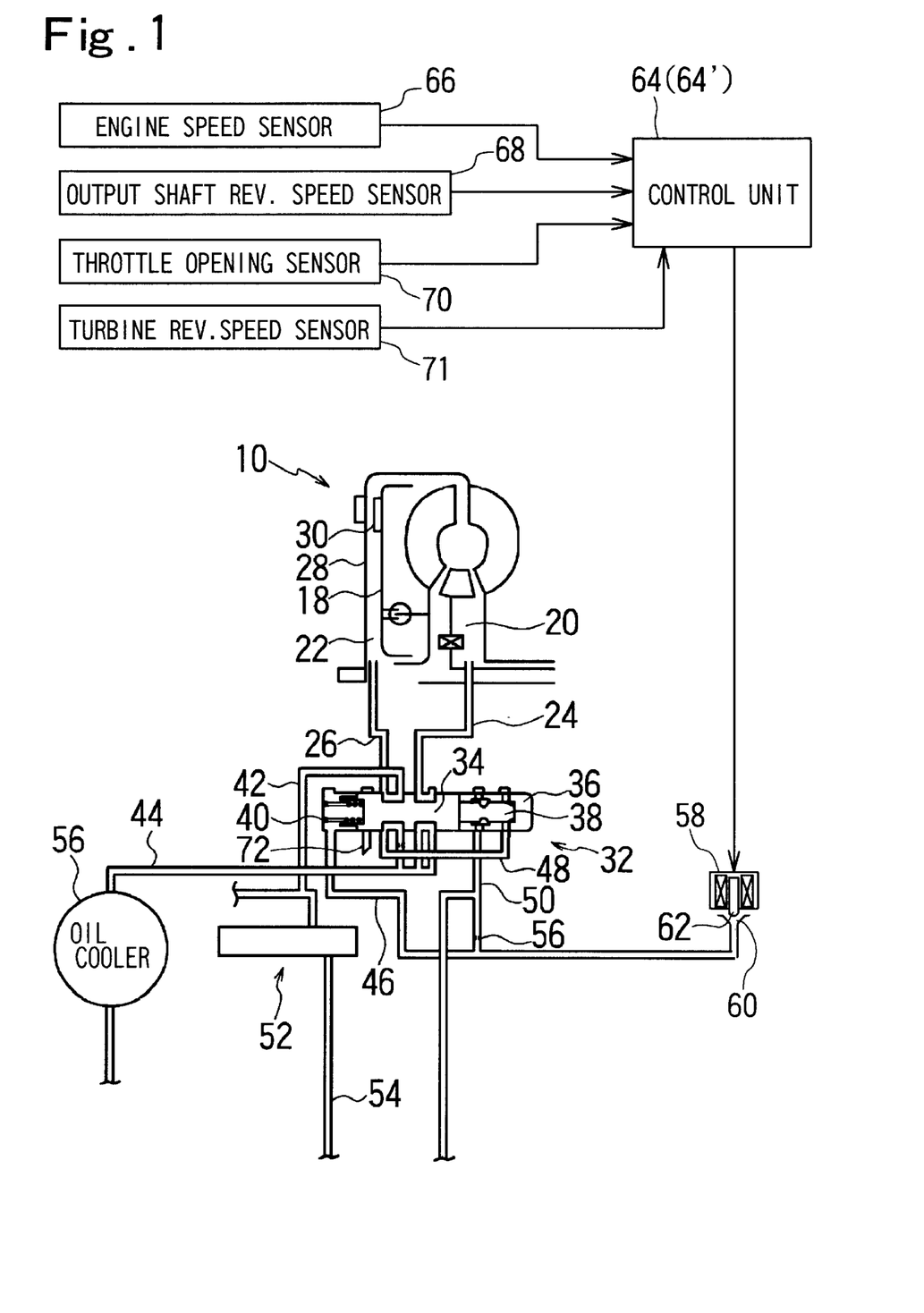
FIG. 1 is a diagram showing a system according to the first embodiment.

FIG. 1 shows a system according to the first embodiment to which the present invention is applied. In a torque converter 10, there is provided a lockup clutch 18 having a facing 30, which contacts with a friction surface formed on a longitudinal wall of a cover 28. A release chamber 22 is formed between the longitudinal wall of the cover 28 and the lockup clutch 18. An apply chamber 20 is formed at the opposite of the release chamber 22 across the lockup clutch 18. The lockup clutch 18 is engaged and disengaged by changing a differential pressure between hydraulic pressure of the apply chamber 20 and hydraulic pressure of the release chamber 22 (hereinafter referred to as lockup differential pressure).

The apply chamber 20 connects to an oil channel 24, and the release chamber 22 connects to an oil channel 26. A lockup control valve 32 controls the supplying state of the hydraulic pressure to the oil channel 24 and the oil channel 26.

The lockup control valve 32 has a spool 34, a sleeve 36, a plug 38 and a spring 40. The lockup control valve 32 also connects to an oil channel 42, an oil channel 44, an oil channel 46, an oil channel 48 and an oil channel 50.

The oil channel 42 is supplied with a constant pressure from a torque converter relief valve 52. The torque converter relief valve 52 performs a regulating action by using hydraulic pressure of the oil channel 54, which is regulated correspondingly to an engine torque by a pressure regulator valve, not shown. The oil channel 44 connects to an oil cooler 56, and the oil from the oil cooler 56 is used for lubrication. The oil channel 50 is supplied with a constant pressure that is regulated by a regulating valve, not shown. The oil channel 46 which is branched from the oil channel 50 via an orifice 56 connects to a lockup solenoid 58.

The lockup solenoid 58 has a plunger 62 that closes an opening 60 in the oil channel 46 when no current is being carried. The current-carrying state of the lockup solenoid 58 is controlled with a lockup duty ratio according to a signal from a control unit 64. More specifically, the lockup solenoid 58 is repeatedly turned on and off in a predetermined cycle to open the opening 60 according to an ON time ratio, thus regulating the hydraulic pressure of the oil channel 46 so that it can be in inverse proportion to an ON time.

The control unit 64 receives signals from the following sensors: an engine speed sensor 66 that detects an engine speed Ne, an output shaft revolutionary speed sensor 68 that detects an output shaft revolutionary speed No of a transmission, a throttle opening sensor 70, and a turbine revolutionary speed sensor 71 that detects a turbine revolutionary speed Nt. According to the signals from these sensors, the control unit 64 controls the operation of the lockup solenoid 58. The control unit 64 is able to calculate an input torque TQ that is inputted to the torque converter 11 from the engine speed and the like.

The lockup clutch 18 is gradually disengaged in the following manner. The ON time ratio as the lockup duty ratio is controlled to cause the plunger 60 to completely close the opening 60. This generates the same hydraulic pressure in the oil channel 46 as in the oil channel 50, and the generated hydraulic pressure acts on the left end of the spool 34 in the lockup control valve 32 in FIG. 1. This brings the spool 34 into the state as shown in FIG. 1, wherein the oil channel 42 and the oil channel 44 connect to the oil channel 26 and oil channel 24, respectively. The hydraulic pressure of the oil channel 42 is supplied to the release chamber 22 through the oil channel 26, and the hydraulic pressure of the release chamber 22 flows into the apply chamber 20 through a clearance between the friction surface of the cover 28 and the facing 30. The hydraulic pressure from the release chamber 22 then returns to the lockup control valve 32 through the oil channel 24 and is emitted into the oil channel 44.

That is, the hydraulic pressure is supplied to the release chamber 22 through the oil channel 26 and is then emitted from the apply chamber 20 into the oil channel 24. This causes the hydraulic pressure of the release chamber 22 to be equal to the hydraulic pressure of the apply chamber 20, thereby disengaging the lockup clutch 18. In short, the torque converter 10 is brought into a so-called torque converter state wherein the torque is transmitted only through fluid coupling.

The lockup clutch 18 is gradually brought into the engaged state from the above disengaged state in the following manner. As the lockup duty ratio (the ON time ratio) given to the lockup solenoid 58 by the control unit 64 is gradually increased, the oil is emitted from the opening 60 to lower the hydraulic pressure of the oil channel 46. This lowers the hydraulic pressure applied to the left end of the spool 34 in the lockup control valve 32, so that the spool 34 and the plug 38 move to the left in FIG. 1. If the spool 34 and the plug 38 has moved to the left by a predetermined amount, the oil channel 26 slightly connects to a drain port 72 and the oil channel 42 connects to the oil channel 24 at the same time.

Since the hydraulic pressure of the oil channel 26 is fed back to the right end of the plug 38 through the oil channel 38, the lockup control valve 32 is brought into a pressure-regulating state. Therefore, the hydraulic pressure of the oil channel 26 is regulated according to the hydraulic pressure applied to the left end of the spool 34 from the oil channel 46.

In this state, the apply chamber 20 in the torque converter 10 is supplied with the hydraulic pressure through the oil channel 24, and the hydraulic pressure flows from the apply chamber 20 into the release chamber 22 through a gap between the lockup clutch 18 and the cover 28 and is emitted from the oil channel 26. The hydraulic pressure in the oil channel 26 is controlled by the hydraulic pressure of the oil channel 46, i.e., the hydraulic pressure that is regulated in inverse proportion to the lockup duty ratio. Since the hydraulic pressure in the release chamber 22 is lower than the hydraulic pressure in the apply chamber 20, the facing 30 of the lockup clutch 18 is pressed against the friction surface of the cover 28. As stated previously, the lockup solenoid 58 controls the force for pressing the lockup clutch 18 (that is, the lockup differential pressure).

Figure 2:
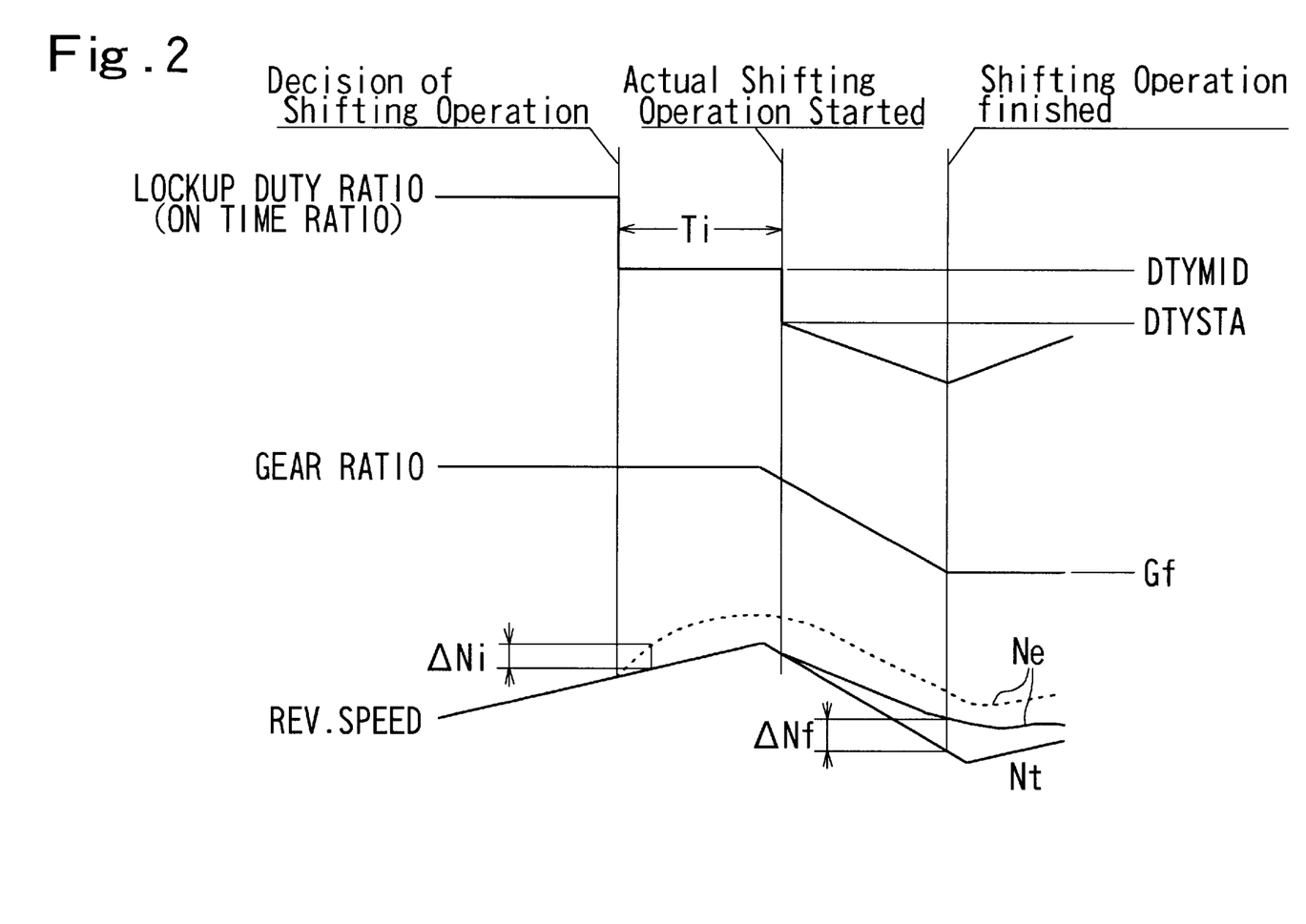
FIG. 2 is a characteristic drawing showing an engine speed and the like during a shifting operation.

FIG. 2 is a characteristic drawing showing an engine speed and the like during the shifting operation.

When the decision is made to perform the shifting operation, the lockup duty ratio is lowered to a first duty ratio DTYMID in such a range as not to slip the lockup clutch 18 so that the lockup differential pressure can be a minimum value. The lockup duty ratio is then maintained at the first duty ratio DTYMID. If the lockup clutch 18 is engaged in the normal driving condition wherein the shifting operation is not performed, the lockup duty ratio is set at the maximum value in order to prevent the slip of the lockup clutch 18. Thus, if the lockup duty ratio is lowered from the maximum value from the start of the actual shifting operation, the response is delayed to shift a slip start timing. This causes a shock or causes the lockup clutch 18 to be not disengaged until the end of the shifting operation.

If the engine blows up when the lockup clutch 18 slips since the lockup differential pressure is too low due to a low first duty ratio DTYMID, the first duty ratio DTYMID is corrected (learning) in order to prevent the engine from blowing up during a next shifting operation. Whether the engine is blowing up or not is determined according to a slip revolutionary speed ΔNi. The slip revolutionary speed ΔNi is equivalent to the slip of the lockup clutch 18 during a period of time since a decision is made to perform the shifting operation until the gear ratio starts changing actually, that is, a difference between the engine speed and the turbine revolutionary speed (Ne−Nt). The gear ratio (the turbine revolutionary speed Nt/the output shaft revolutionary speed No) is regularly detected.

The first duty ratio DTYMID is maintained in a period of time (Ti) since the decision is made to perform the shift until the gear ratio starts changing. In other words, the lockup differential pressure is maintained at the minimum value within such a range as not to slip the lockup clutch 18 until the gear ratio starts changing to start the actual shifting operation.

When the gear ratio starts changing to start the actual shifting operation, the lockup duty ratio is lowered to a second duty ratio DTYSTA. The lockup duty ratio is lowered from the second duty ratio DTYSTA until the end of the shift at a predetermined rate of change so that the lockup differential pressure can be lowered at a predetermined gradient. By controlling the lockup duty ratio in the above manner, a slip revolutionary speed ΔNf (=Ne−Nt) is made equal to the target slip revolutionary speed at the end of the shifting operation (i.e. when the gear ratio reaches a shift finish gear ratio Gf).

If the slip revolutionary speed ΔNf at the end of the shift lies outside the range between an upper limit Nfh and a lower limit Nfl of the target slip revolutionary speed, the second duty ratio DTYSTA is corrected (learning) so that the slip revolutionary speed ΔNf at the end of a next shift can get closer to the target slip revolutionary speed. In the present embodiment, the predetermined rate of change in the lockup duty ratio is a fixed value.

Figure 3:
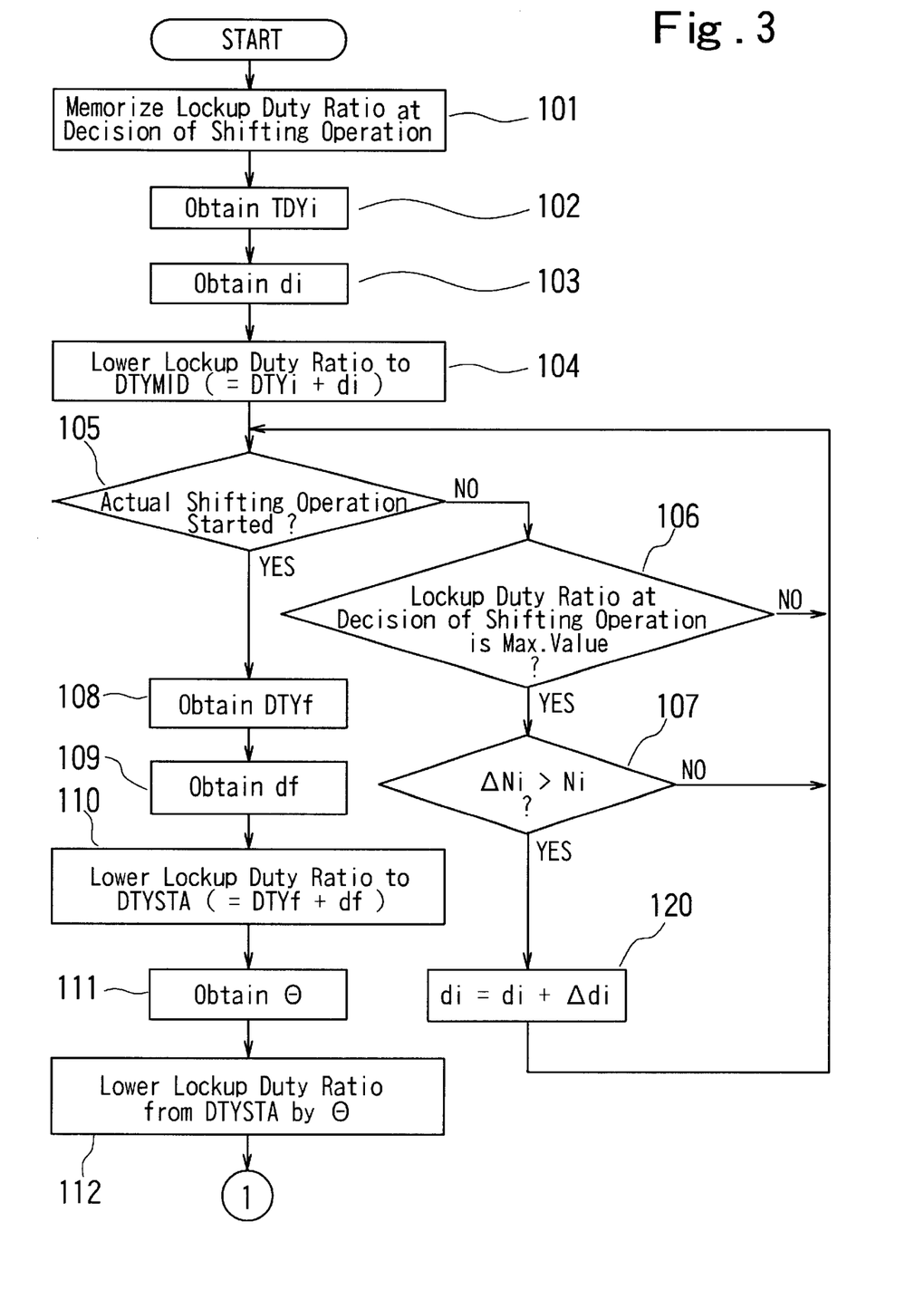
FIGS. 3 and 4 are flow charts showing a controlling process during a shifting operation according to the first embodiment.
Figure 4:
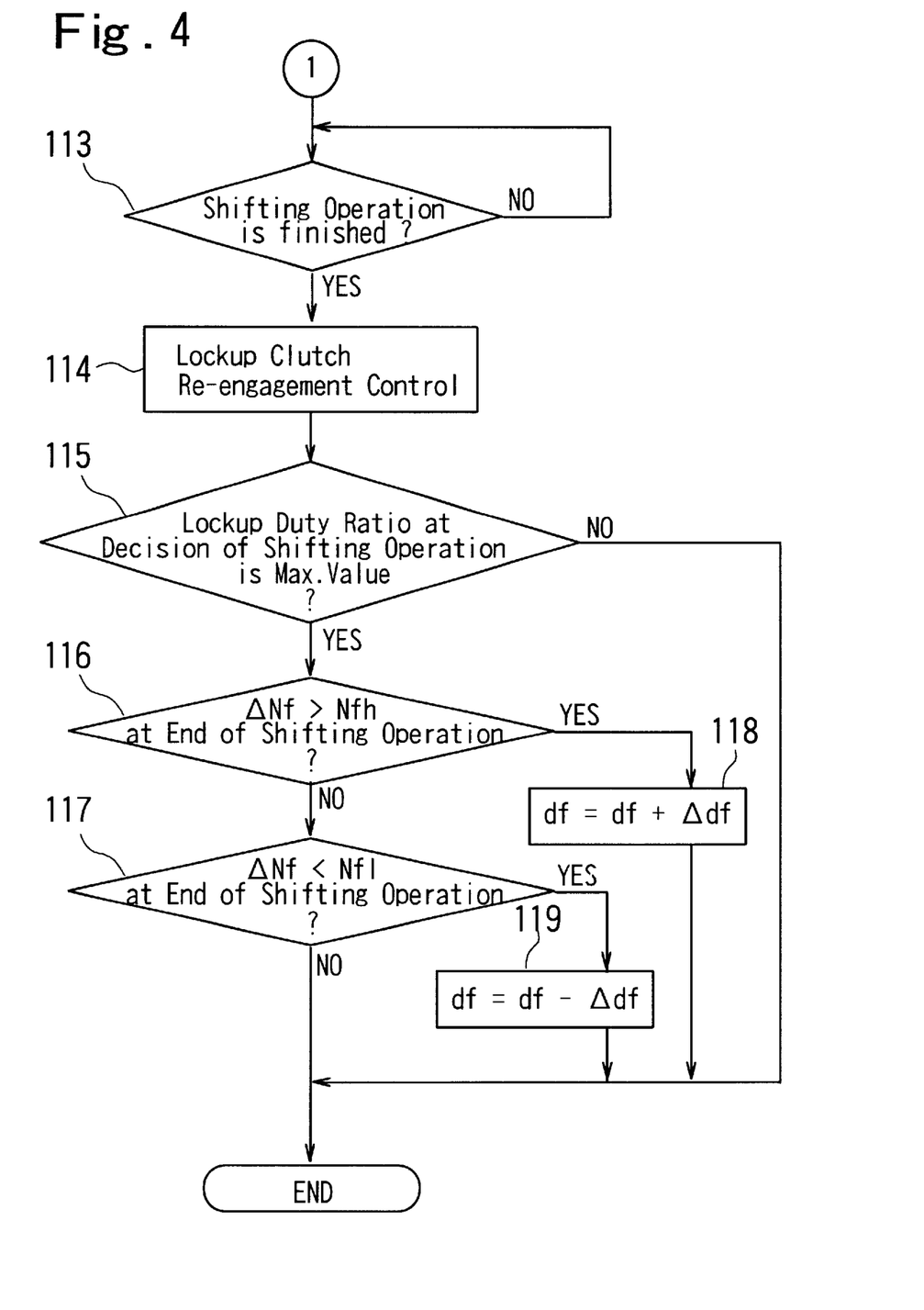

FIG. 3 and FIG. 4 are the flow charts showing a controlling process executed by the control unit 64 during the shifting operation according to the present embodiment. The control unit 64 performs the controlling operation at predetermined time intervals. The control unit 64 regularly calculates the input torque TQ and the gear ratio and detects an oil temperature TMP of the transmission.

In a step 101, the control unit 64 memorizes the lockup duty ratio when the decision is made to perform the shifting operation.

In a step 102, a basic duty ratio TDYi is found from the input torque TQ according to a map that represents a relationship between the input torque TQ and the basic duty ratio TDYi.

In a step 103, a correction value di of the basic duty ratio DTYi is found from the input torque TQ, the oil temperature TMP and so forth according to maps that are prepared for the respective ones of the input torque TQ, the oil temperature TMP and so forth.

In a step 104, the lockup duty ratio is lowered to the first duty ratio DTYMID that is obtained by the following calculation: DTYi+di.

In a step 105, it is determined whether the actual shifting operation is started or not (i.e. whether the gear ratio starts changing or not).

If the actual shifting operation is started, the process goes to a step 108. If the actual shifting operation is not started, the process goes to a step 106.

In the step 106, it is determined whether the ON time ratio as the lockup duty ratio is the maximum value or not (the lockup differential pressure is the maximum pressure) when the decision is made to perform the shifting operation. The step 106 aims at preventing the incorrect learning by checking the operating state of the lockup solenoid 58. More specifically, the first duty ratio DTYMID may be changed to an incorrect duty ratio if the lockup duty ratio is corrected in the case where lockup duty ratio is not the maximum value when the decision is made to perform the shifting operation.

If the ON time ratio as the lockup duty ratio is the maximum value, the process goes to a step 107. If the ON time ratio as the lockup duty ratio is not the maximum value, the process returns to the step 105.

In the step 107, whether the slip revolutionary speed ΔNi exceeds Ni (set value) or not is determined in a period of time (Ti) in which the lockup duty ratio is maintained at the first duty ratio DTYMID. Ni is a reference value for detecting the blow up of the engine.

If the slip revolutionary speed ΔNi exceeds Ni, the process goes to a step 120. If the slip revolutionary speed ΔNi does not exceed Ni, the process returns to the step 105.

In the step 120, the correction value di is updated by adding Δdi (set value) thereto, and the process then returns to the step 105. In the next shifting operation, the first duty ratio TYMID is increased to prevent the blow up of the engine.

In the step 108, a basic duty ratio DTYf is found from the input torque TQ after the lockup duty ratio is maintained at the first duty ratio DTYMID and the kinds of gear shifting according to a map showing a relationship between the input torque TQ, the kinds of gear shifting and the basic duty ratio DTYf.

In a step 109, a correction value df of the basic duty ratio DTYf is found from the input torque TQ and the oil temperature TMP according to the maps that are prepared from the respective ones of the input torque TQ and the oil temperature TMP.

In a step 110, the lockup duty ratio is lowered to the second duty ratio DTYSTA that is obtained by the following calculation: DTYf+df.

In a step 111, the rate of change θ is found from the input torque TQ and the kinds of gear shifting according to maps that are prepared for the respective ones of the input torque TQ and the kinds of gear shifting.

In a step 112, the lockup duty ratio is lowered from the second duty ratio DTYSTA by the rate of change θ.

In a step 113, whether the shifting operation is finished or not is determined according to whether the gear ratio has reached the shifting decision finish gear ratio Gf or not.

If the shifting operation is finished, the lockup clutch is re-engaged by increasing the lockup duty ratio at a predetermined rate in a step 114.

Then, it is determined in a step 115 whether the lockup duty ratio is the maximum value or not when the lockup differential pressure is the maximum value, that is, when the decision is made to perform the shifting operation. The step 115 aims at preventing the incorrect learning by checking the operating state of the lockup solenoid 58 as is the case with the step 106.

If the lockup duty ratio is the maximum value, the process goes to a step 115. If the lockup duty ratio is not the maximum value, the controlling process is finished.

In the step 116, it is determined whether the slip revolutionary speed ΔNf is higher than Nfh or not at the end of the shifting operation.

If the slip revolutionary speed ΔNf is higher than Nfh, the process goes to a step 118. If the slip revolutionary speed A Nf is not higher than Nfh, the process goes to a step 117.

In the step 118, the correction value df is updated by adding Δdf thereto, and then the controlling process is finished.

The step 118 aims to make the slip revolutionary speed ΔNf lower than Nfh in the next shifting operation.

In the step 117, it is determined whether the slip revolutionary speed ΔNf is lower than Nfl at the end of the shifting operation.

If the slip revolutionary speed ΔNf is lower than Nfl, the process goes to a step 119. If the slip revolutionary speed ΔNf is not lower than Nfl, the controlling process is finished.

In the step 119, the controlling process is finished after the correction value df is updated by subtracting Δdf therefrom so that that the slip revolutionary speed ΔNf can be higher than Nfl in the next shifting operation.

The functional part of the control unit 64 executing the steps 101 to 107 and the step 120 forms the first lockup duty ratio setting and maintaining means of the invention. The functional part of the control unit 64 executing the steps 108 to 117 and the steps 118 to 119 forms the second lockup duty ratio control means.

According to the first embodiment described above, when the decision is made to perform the shifting operation, the lockup duty ratio is lowered to the first duty ratio. This makes it possible that the lockup clutch comes into the slipping state after the start of the actual shifting operation even if a shifting time is short. Moreover, the first duty ratio is corrected according to a difference in the slip revolutionary speed during the time between the decision to perform a shifting operation and the start of the actual shifting operation in the prior shifting operation. This makes it possible to surely set the minimum hydraulic pressure within such a range as not to slip the lockup clutch, and prevents the lockup clutch from slipping until the start of the actual shifting operation. On the start of the actual shifting operation, the lockup duty ratio is lowered from the second duty ratio, which is determined separately from the first duty ratio and is corrected according to the slip revolutionary speed at the end of the prior shifting operation. This enables the slip revolutionary speed to stably reach the target slip revolutionary speed at the end of the shifting operation even if the shifting time is short or the shifting time varies according to the variation, the deterioration, etc. of shift clutches. This reduces the shift shock.

Since the slip revolutionary speed at the end of the shifting operation can be made equal to the target slip revolutionary speed, the re-engagement of the lockup clutch after the finish of the shifting operation is carried out in a short time. Thus, the increase of fuel consumption due to delayed re-engagement of the lockup clutch is prevented.

If the lockup duty ratio is not the maximum value when the decision is made to perform the shifting operation, the first duty ratio and the second duty ratio are prohibited from being corrected i.e. learned. This prevents the incorrect learning.

There will now be described the second embodiment of the present invention.

The second embodiment is different from the first embodiment as follows. According to the first embodiment, the second duty ratio as the lockup duty ratio is learning-controlled so that the slip revolutionary speed at the end of the shift can lie within the range between the upper limit and the lower limit of the target slip revolutionary speed. According to the second embodiment, however, a control unit 64' (see FIG. 1) controls the rate of change θ while maintaining the second duty ratio at a uniform value so that the slip revolutionary speed at the end of the shift can be equal to the target slip revolutionary speed.

Figure 5:
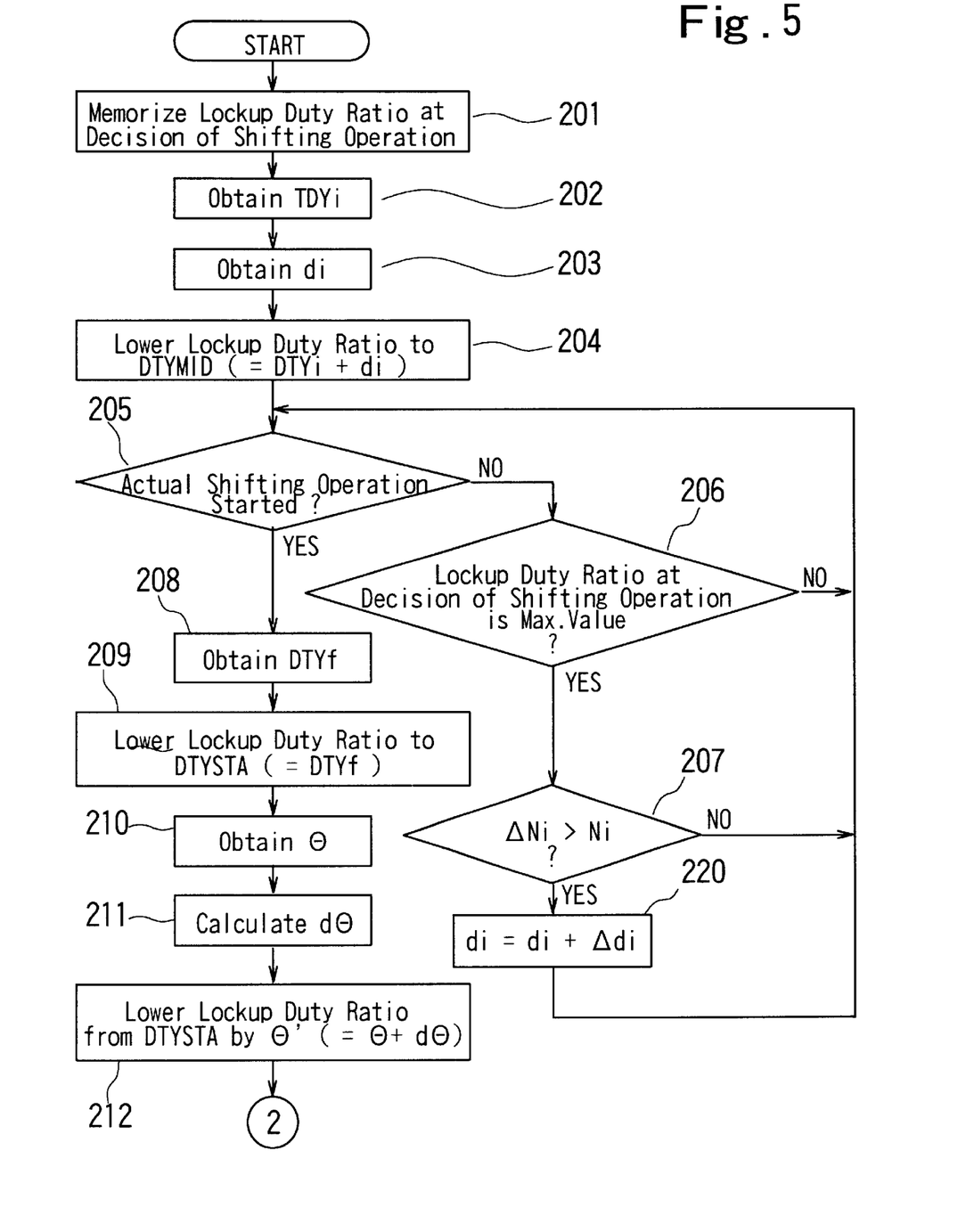
FIGS. 5 and 6 are flow charts showing a controlling process during a shifting operation according to the second embodiment.
Figure 6:
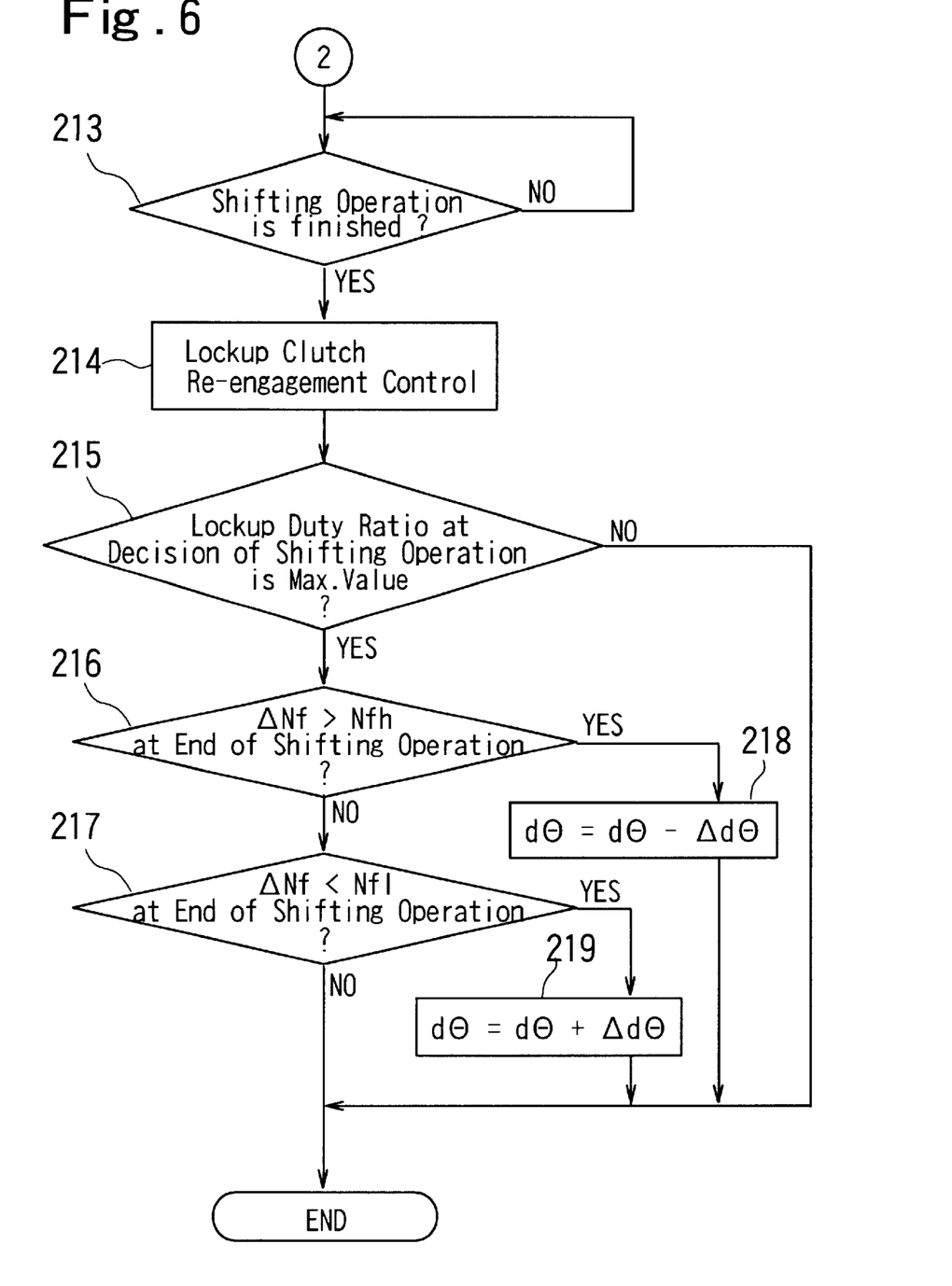

FIGS. 5 and 6 are flow charts showing the controlling process executed by the control unit 64' according to the second embodiment.

Steps 201 to 205, steps 206, 207 and 220 and a step 208 are equivalent to the steps 101 to 105, the steps 106, 107 and 120 and the step 108 according to the first embodiment described with reference to FIG. 3.

In a step 208, a basic duty ratio DTYf is calculated, and in a step 209, the lockup duty ratio is lowered to the second duty ratio DTYSTA that is equivalent to DTYf. According to the present embodiment, the second duty ratio DTYSTA is maintained at a uniform value without being corrected.

In a step 210, the initial rate of change θ is found from the input torque TQ after the period of time Ti and the kinds of gear shifting according to maps that are prepared for the respective ones of the input torque TQ and the kinds of gear shifting.

In a step 211, a correction value dθ for the initial rate of change θ is calculated from the input torque TQ after the maintaining time Ti and the oil temperature TMP.

In a step 212, the lockup duty ratio is lowered from the second duty ratio DTYSTA by a rate of change θ that is obtained by the following expression: θ+dθ.

In a step 213, whether the shifting operation is finished or not is determined according to whether the gear ratio has reached the shifting decision finish gear ratio Gf or not.

If the shifting operation is finished, the lockup clutch is re-engaged by increasing the lockup duty ratio at a predetermined rate in a step 214.

Then, it is determined in a step 215 whether the lockup duty ratio is the maximum value or not when the decision is made to perform the shifting operation.

If the lockup duty ratio is the maximum value, the process goes to a step 216. If the lockup duty ratio is not the maximum value, the controlling process is finished.

In the step 216, it is determined whether the slip revolutionary speed ΔNf is higher than Nfh or not.

If the slip revolutionary speed ΔNf is higher than Nfh, the process goes to a step 218. If the slip revolutionary speed ΔNf is not higher than Nfh, the process goes to a step 217.

In the step 218, the correction value do is updated by subtracting Δdθ therefrom so that the slip revolutionary speed ΔNf can be lower than Nfh in the next shifting operation. The controlling process is then finished.

In the step 217, it is determined whether the slip revolutionary speed ΔNf is lower than Nfl or not at the end of the shifting operation.

If the slip revolutionary speed ΔNf is lower than Nfl, the process goes to a step 219. If the slip revolutionary speed ΔNf is not lower than Nfl, the controlling process is finished.

In the step 219, the correction value dθ is updated by adding Δdθ thereto so that the slip revolutionary speed ΔNf can be higher than Nfl in the next shifting operation. The controlling process is then finished.

In the present embodiment, the functional part of the control unit 64' executing the steps 210 to 207 and the step 220 forms the first lockup duty ratio setting and maintaining means of the invention, and the functional part executing the steps 208 to 217 and the steps 218 to 219 forms the second lockup duty ratio control means.

In the second embodiment described above, when the decision is made to perform the shifting operation, the lockup duty ratio is lowered to the first duty ratio. This makes it possible that the lockup clutch comes into the slipping state after the start of the actual shifting operation even if the shifting time is short. Moreover, the first duty ratio is corrected according to a difference in the slip revolutionary speed between the decision to perform the shifting operation and the start of the actual shifting operation in the prior shifting operation. This makes it possible to surely set the minimum hydraulic pressure within such a range as not to slip the lockup clutch, and prevents the lockup clutch from slipping until the start of the actual shifting operation. On the start of the actual shifting operation, the lockup duty ratio is lowered from the second duty ratio, which is determined separately from the first duty ratio, by the rate of change that is corrected according to the slip revolutionary speed at the end of the prior shifting operation. This enables the slip revolutionary speed to stably reach the target slip revolutionary speed at the end of the shifting operation even if the shift time is short or the shift time varies according to the variation, the deterioration of shift clutches and the like. This reduces the shift shock. If the lockup duty ratio is not the maximum value when the decision is made to perform the shifting operation, the first duty ratio and the rate of change θ' are prohibited from being corrected i.e. learned for the next shifting operation. This prevents incorrect learning.

In this second embodiment also, since the slip revolutionary speed at the end of the shifting operation can be made equal to the target slip revolutionary speed, the re-engagement of the lockup clutch after the finish of the shifting operation is carried out in a short time. Thus, the increase of fuel consumption due to delayed re-engagement of the lockup clutch is prevented.

What is claimed is:

1. A lockup control device for an automatic transmission equipped with a lockup clutch which is controlled by a hydraulic pressure regulated with a lockup duty ratio, and which is disengaged during a shifting operation, said lockup control device comprising:

first lockup duty ratio setting and maintaining means for setting the lockup duty ratio at a first duty ratio as a lower control hydraulic pressure than a control hydraulic pressure before a determination of the shifting operation within such a range as not to slip said lockup clutch and maintaining said first duty ratio until an actual shifting operation is started;

second lockup duty ratio control means for setting the lockup duty ratio at a second duty ratio at the time an actual shifting operation is started and controlling the lockup duty ratio in such a manner that a hydraulic pressure is lowered from a hydraulic pressure corresponding to said second duty ratio at a predetermined rate of change until the shifting operation is finished; and wherein said second lockup duty ratio control means learning-controls said second duty ratio so that a slip revolutionary speed at the end of the shifting operation can be equal to a target slip revolutionary speed.

2. A lockup control device according to claim 1, wherein:

said second lockup duty ratio control means learning-corrects said second duty ratio according to a difference between a slip revolutionary speed and a target slip revolutionary speed at the end of a prior shifting operation, thereby making the slip revolutionary speed at the end of the present shifting operation closer to the target slip revolutionary speed.

3. A lockup control device according to claim 1, wherein:
said second lockup duty ratio control means learning-corrects said predetermined rate of change according to a difference between a slip revolutionary speed and a target revolutionary speed at the end of a prior shifting operation, thereby making the slip revolutionary speed at the end of the present shifting operation closer to the target slip revolutionary speed.

4. A lockup control device according to claim 1, wherein:
said first lockup duty ratio setting and maintaining means corrects said first duty ratio and maintains the corrected first duty ratio during a next shifting operation if a slip of said lockup clutch is detected while maintaining said first duty ratio during the present shifting operation.

5. A lockup control device according to any one of claim 1 through claim 4, wherein:
if said lockup duty ratio is not a maximum value when a decision is made to perform the shifting operation, said first duty ratio and said second duty ratio or said predetermined rate of change are prohibited from being corrected.

6. A lockup control device according to claim 1, wherein:
said lockup clutch is engaged after the shifting operation is finished.

7. A lockup control device for an automatic transmission equipped with a lockup clutch which is controlled by a hydraulic pressure regulated with a lockup duty ratio, and which is disengaged during a shifting operation, said lockup control device comprising:
a lockup duty ratio control means for setting the lockup duty ratio at a predetermined duty ratio at the time an actual shifting operation is started and controlling the lockup duty ratio in such a manner that a hydraulic pressure is lowered from a hydraulic pressure corresponding to said predetermined duty ratio at a predetermined rate of change until the shifting operation is finished; and
wherein said lockup duty ratio control means learning-controls said predetermined duty ratio so that a slip revolutionary speed at the end of the shifting operation can be equal to a target slip revolutionary speed.

8. A lockup control device according to claim 7, wherein:
said lockup duty ratio control means learning-corrects said predetermined duty ratio according to a difference between a slip revolutionary speed and a target slip revolutionary speed at the end of a prior shifting operation, thereby making the slip revolutionary speed at the end of the present shifting operation closer to the target slip revolutionary speed.

9. A lockup control device according to claim 7, wherein:
said lockup duty ratio control means learning-corrects said predetermined rate of change according to a difference between a slip revolutionary speed and a target revolutionary speed at the end of a prior shifting operation, thereby making the slip revolutionary speed at the end of the present shifting operation closer to the target slip revolutionary speed.

10. A lockup control device according to claim 7, wherein:
said lockup clutch is engaged after the shifting operation is finished.

* * * * *